July 16, 1929.  J. W. CARLSON ET AL  1,721,104
CHECK CERTIFIER
Filed April 22, 1927  3 Sheets-Sheet 1

Inventors:
John W. Carlson
Ole Sletterold
Thomas M. Walsh

By: Williams, Bradbury,
McCaleb & Hinkle
Atty's

July 16, 1929.  J. W. CARLSON ET AL  1,721,104
CHECK CERTIFIER
Filed April 22, 1927  3 Sheets-Sheet 3

Inventors:
John W. Carlson
Ole Slettevold &
Thomas M. Walsh.
By: Williams, Bradbury,
McCaleb & Hinkle
Attys Patented July 16, 1929.

1,721,104

UNITED STATES PATENT OFFICE.

JOHN W. CARLSON AND THOMAS M. WALSH, OF CHICAGO, AND OLE SLETTEVOLD, OF EVANSTON, ILLINOIS, ASSIGNORS TO HEDMAN MANUFACTURING COMPANY, OF CHICAGO, ILLINOIS, A CORPORATION OF ILLINOIS.

CHECK CERTIFIER.

Application filed April 22, 1927. Serial No. 185,730.

Our invention relates to a certifier for commercial paper such as checks and the like.

It will be shown and described as embodied in a machine adapted to imprint upon a check the value for which and the date on which it is certified and also other information indicative of certification, leaving it necessary for the bank official only to add his name, initials or other identification to complete the certification. Following the present common practice of banks, the information indicative of certification is arranged to surround the imprint of the value, although, of course, other arrangements may be adopted if desired.

The principal object of our invention is to simplify and prevent the alteration of certifications of checks and the like.

Another object is to provide a single machine which will selectively imprint values and other desired certification information.

Another object is to provide a machine which is easy to manipulate, reliable in operation and inexpensive to manufacture.

Other objects and advantages will hereinafter appear.

In the accompanying drawings, which illustrate one embodiment of the invention:

Figure 1:
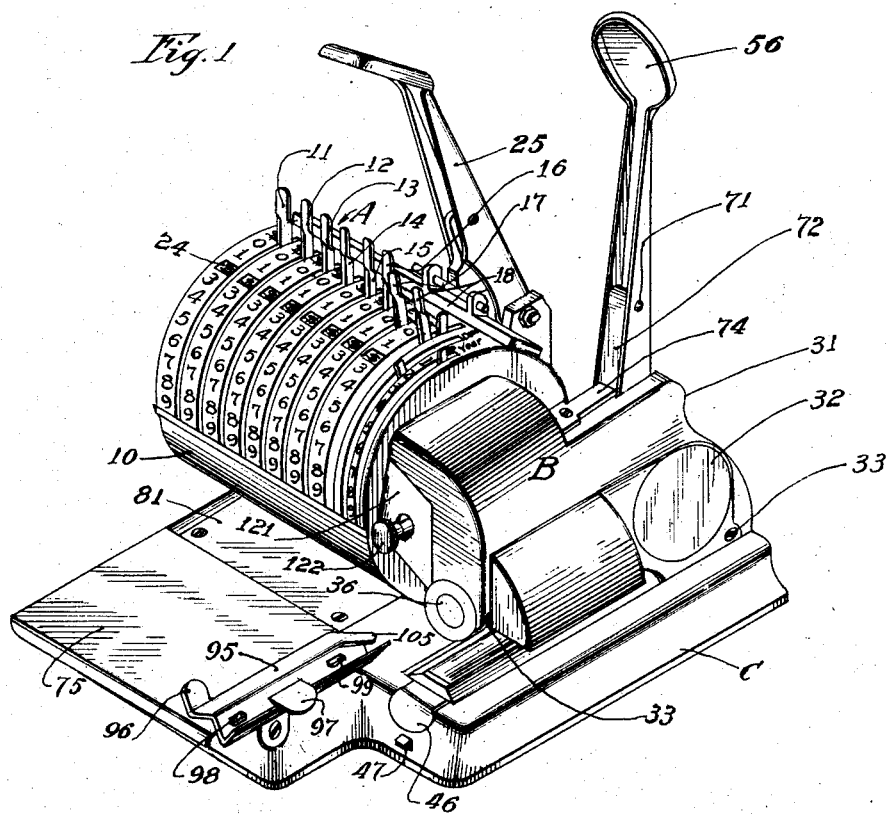
Fig. 1 is a perspective of the complete certifier.

In general, the machine comprises two imprinting units, one for selectively imprinting values and, if desired, also dates upon the paper, and the other for imprinting additional information to indicate that the paper is certified and by whom. A carriage is provided to hold the paper and carry it from one unit to the other. In the preferred form of machine the two imprinting units are separately and sequentially operated, the value imprinting unit being operated first, and the carriage being moved during and by the operation of the other unit.

The value and date imprinting unit A and the unit B, which imprints the other information, are mounted together on a base C of cast or pressed metal.

The value and date imprinting unit A includes a sheet metal casing and support 10 which is pivotally mounted on base C. Within and rotatively mounted on a shaft supported by the end walls of the casing are a series of independently movable type sectors. The peripheries of these type sectors are provided with the requisite type selectively to produce the digits of value and the months, days and years for dates. The sectors for the digits of dollar values are respectively provided with operating handles 11 to 16, inclusive, and the sectors for the digits of cent values are respectively provided with operating handles 17 and 18. The month sector has an operating handle 19, the sectors for the digits of the days have handles 20 and 21, respectively, and those for the digits of the years have handles 22 and 23, respectively. With the exception of handle 22 of the sector for the tens digits of years, all of the sector operating handles project through corresponding slots in the casing so as to be readily manipulated by the operator. Since the tens digit year sector will be moved only once in ten years, its lever 22 is made shorter than the other levers so as not to project beyond the casing and is behind the front casing wall. In this position it is out of the way and cannot interfere with the levers which must be manipulated with greater frequency. However, it can be moved readily by a pencil or some other pointed instrument inserted through the slot in which the levers 20 and 21 are adapted to be moved. Guide indications may be arranged beside the operating handle slots to facilitate proper adjustment of the corresponding sectors to produce the desired imprint. If desired, visible indicia, corresponding to the type characters, may be arranged around the front portions of the type sectors so as to be visible through openings, such as the slot 25 illustrated for the value sectors, and thus afford a check upon the correct position of the sectors to produce the desired imprint.

The casing, and with it the value and date type sectors, are moved downwardly against the paper by a lever 25. A stationary platen co-operates with the movable type to produce the imprint. Usually the value and date type and/or the platen will be constructed so as to indent or perforate the paper and an inking device is provided to ink the type so that a clear and non-eradicable imprint will be made upon the paper. Unit A, including the type sectors and operating mechanism, may be of the same general form as the check protector set forth in Patent No. 1,197,279, issued September 5, 1916, to Douglas F. Fesler, and the type and platen may be constructed as set forth in Patent No. 1,338,645, issued April 27, 1920, to Douglas F. Fesler and Herbert R. Hedman.

Figure 4:
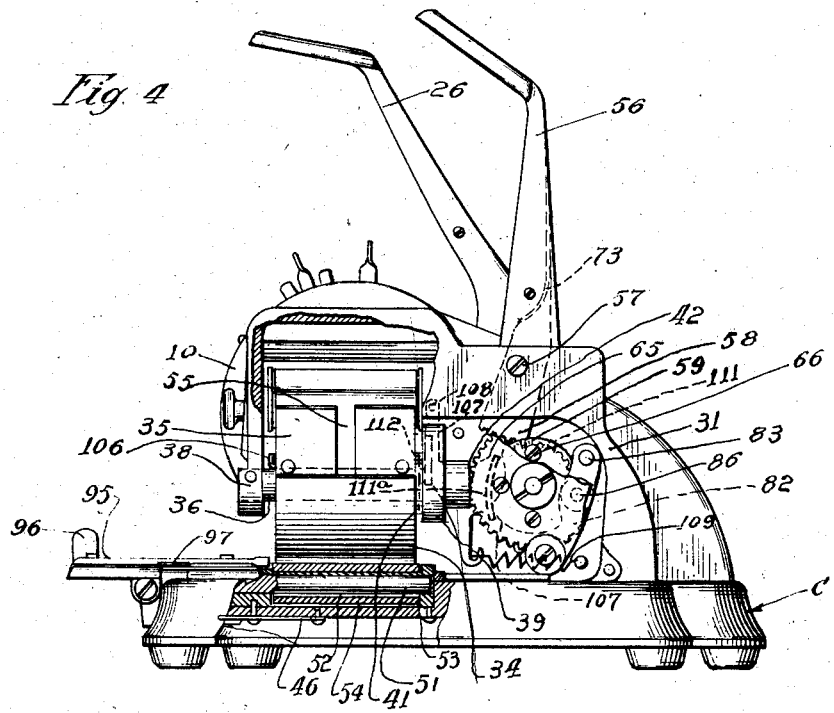
Fig. 4 is a side elevation and partial section.

Unit B, which is the portion of the machine which prints the certifying indicia, is also mounted upon base C, and has as its principal support a combination housing and supporting frame 31. This housing is formed, preferably, as a part of the base and is joined thereto through the rear portion thereof, as shown in Fig. 4. Accordingly, the entire front portion of the housing projects forwardly and overhangs a portion of the base C.

A portion of the housing is cut away and is replaced by a removable end plate 32 held to the housing proper by machine screws 33—33. For the purpose of forming the requisite impressions on a check, a printing roller 34 is provided, having a circumferentially disposed printing plate or matrix 35 secured thereto by suitable means such as machine screws 35'. Printing roller 34 is secured on a shaft 36 by set screw 37 and shaft 36 is journaled in downwardly extending projections 38 and 39 on housing 31. Between roller 34 and projection 39 a spacer 41 is provided, which serves to overcome the thrust, in one direction, of shaft 36, while a beveled gear 42 pinned to one end thereof drives the same in a manner which will be described hereinafter, and also serves to overcome shaft thrust in the opposite direction. Immediately beneath printing roller 34 is provided a complementary roller 45 which acts as a platen, and which is revolvably supported in a frame 46, (Fig. 1). This frame is removably positioned in the base and is held in position by a spring clip of any usual construction, the end of which, indicated at 47, projects outwardly from the front of base C so that the clip can be sprung sufficiently to release the platen frame. This permits the entire lower roller or platen assembly to be withdrawn from the machine for purposes of cleaning, replacement and the like.

Platen 45 may be formed of any suitable material, but we have obtained good results by employing as the center spindle 51 a mild steel or any other similar material, while the roller proper has a frame 52 constructed of brass, zinc or the like, and is provided with end flanges 53 between which a rubber outer cylinder 54 is positioned. The rubber is sufficiently live so that it will grip the paper firmly, and permit the use of an indenting or perforating species of type on the printing roller, if desired, or so that the platen may accommodate for any irregularity in the printing matrix, and at the same time be sufficiently rigid to form a firm support.

Printing plate 35 may carry a prepared surface for printing any kind of indicia but we have adapted the same for printing certifying matter around an amount line impressed on a check or similar piece of commercial paper by the unit A.

Figure 2:
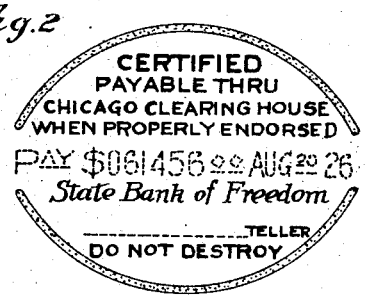
Fig. 2 is a facsimile of a certification imprint such as may be produced by the machine.

In Fig. 2 the portion printed by plate 35 is shown in full lines, while the amount line, for purposes of illustration only, is shown in the drawing in dotted lines. In actual use we have employed a blue ink to print the amount and a red ink for the certifying indicia. When the two units are designed to co-operate in this manner, a cut-away portion, indicated by the reference character 55, is provided in plate 35 so that the amount line impressed on the check by unit A will not be marred during the certifying operation. It is obvious that means must be provided for accurately controlling the position of the check as it passes from one unit to another, and such means is provided and will be described in a later portion of the specification.

Unit B is operated by a handle or operating lever 56, pivoted to housing 31 by a pin 57. At the lower end of lever 56 is provided a gear segment 58 meshing with a pinion gear 59 which is free to revolve on a stud shaft 61 secured in the housing. A collar is provided on gear 59 and is cut to form ratchet teeth which co-operate with similarly formed teeth in the edge of a cam 63 which is also free to rotate on shaft 61, the two members thus operating as a one way clutch. Movement of cam 62 toward the end of the shaft is arrested by a collar 63, while gear 59 is forced toward cam 62 by a coil spring 64. A bevel gear 65 is secured to cam 62 by machine screws 66 and meshes with gear 42 secured on shaft 36. Downward motion of handle 56, therefore, serves to rotate gear 59 which, due to the ratchet or the clutch mechanism provided between itself and cam 62, drives cam 62 in the same direction. Cam 62 carries with it gear 65 which, meshing with gear 42, causes a rotation of roller 34 which is secured on shaft 36. The paper being fed to the roller in a manner hereinafter to be described, is carried between printing roller 34 and platen 45 and receives an impression corresponding to the matrix.

Handle 56 is returned automatically to an upward position by mechanism now to be described. A pin 71 has pivoted thereto a depending flat lever 72 which flat lever is held outwardly by the force of a leaf spring 73 secured to the lower inside face of handle 56. A dog 74 (Fig. 1) is secured to the top of the housing and has its free end bearing against depending lever 72. Depression of handle 56 results in dog 74 forcing depending lever 72 inwardly, and building up a tension in leaf spring 73. This tension is sufficient to raise the handle 56 when it has been brought to its extreme lowermost position. The return of the handle is facilitated by the fact that the only portion of the mechanism which it must move as it progresses to its upward position is gear 59 which is permanently meshed with gear segment 58.

Reference was made in a prior paragraph to means for accurately positioning the check as it is moved from one unit to another. This means comprises a movable carriage having a flat check supporting table 75 with a lug turned under from the two side edges in which the ends of supporting rod 76 are secured. A supporting frame 77, which is adjustably attached to base C by screws 78—78, or in any other suitable manner, is provided with projecting flanges 79—79 which slidably support rod 76. The forward edge of table 75 extends under a supporting plate 81, in such a manner as to permit a support therefor, but at the same time allow the entire plate to slide sideways thereof.

Figure 5:
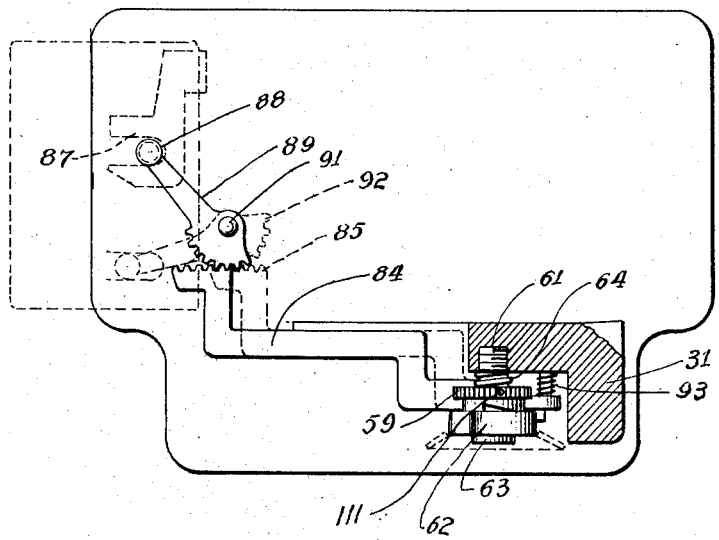
Fig. 5 is an enlarged detailed view of part of the mechanism which reciprocates the check holding carriage.

The movement of the carriage is from unit A to unit B and back again; and this movement is accomplished through mechanism operated by handle 56. A link 82 (Fig. 4) has one end pivoted to a stud 83 threaded in the housing, and the other end pivoted to a rack member 84 provided with rack teeth 85 (Fig. 5). Midway of link 82 is a roller 86 closely abutting cam 62. This cam, as described, is turned by clutch mechanism when handle 56 is depressed, and turning of the cam, as shown, will result in a displacement of roller 86, and a consequent displacement of link 82.

Beneath table 75 and integral therewith is a guideway 87 into which is projected an upwardly extending finger 88 on an arm designated generally by reference character 89 and pinned to the base C at 91. One portion of arm 89 is provided with a gear segment 92 meshing with rack 85. Accordingly, movement of rack 85 incidental to the depression of handle 56 results in a partial rotation of arm 89 about pivot 91. Table 75 is, accordingly, forced to a position adjacent unit B.

When the downward stroke of handle 56 has been completed, the carriage is returned to its normal position adjacent unit A. This movement is accomplished by a coil spring 93 mounted on pin 83, and having one end thereof engaging link 82 in such a manner as to hold it in an extreme forward position, or, as shown in Fig. 4, a position to the left, so that roller 86 will bear in the depressed face in cam 62. The link being returned to this normal position will cause a reverse operation of rack 85, thereby returning the check carriage to its normal position in front of unit A.

Mechanism is provided for engaging the check to hold it in a fixed position on the carriage table during both imprinting operations and automatically to release the check when both imprinting operations have been completed. This mechanism comprises a check gripper 95 hinged to the edge of table 75 and having a projecting handle 96 by which it may be actuated by the operator. A central longitudinal recess is provided toward the lower edge of the gripper into which a leaf spring 97 is adapted to project when the gripper is moved by the operator to clamp the check on table 75. Leaf spring 97 is secured to the bottom of table 75, and is tensioned so that when it projects through the recess in the gripper in the manner shown in Fig. 1, it exerts a downward pressure on the gripper to maintain the same firmly down against the check and thereby prevent its displacement.

Figure 3:
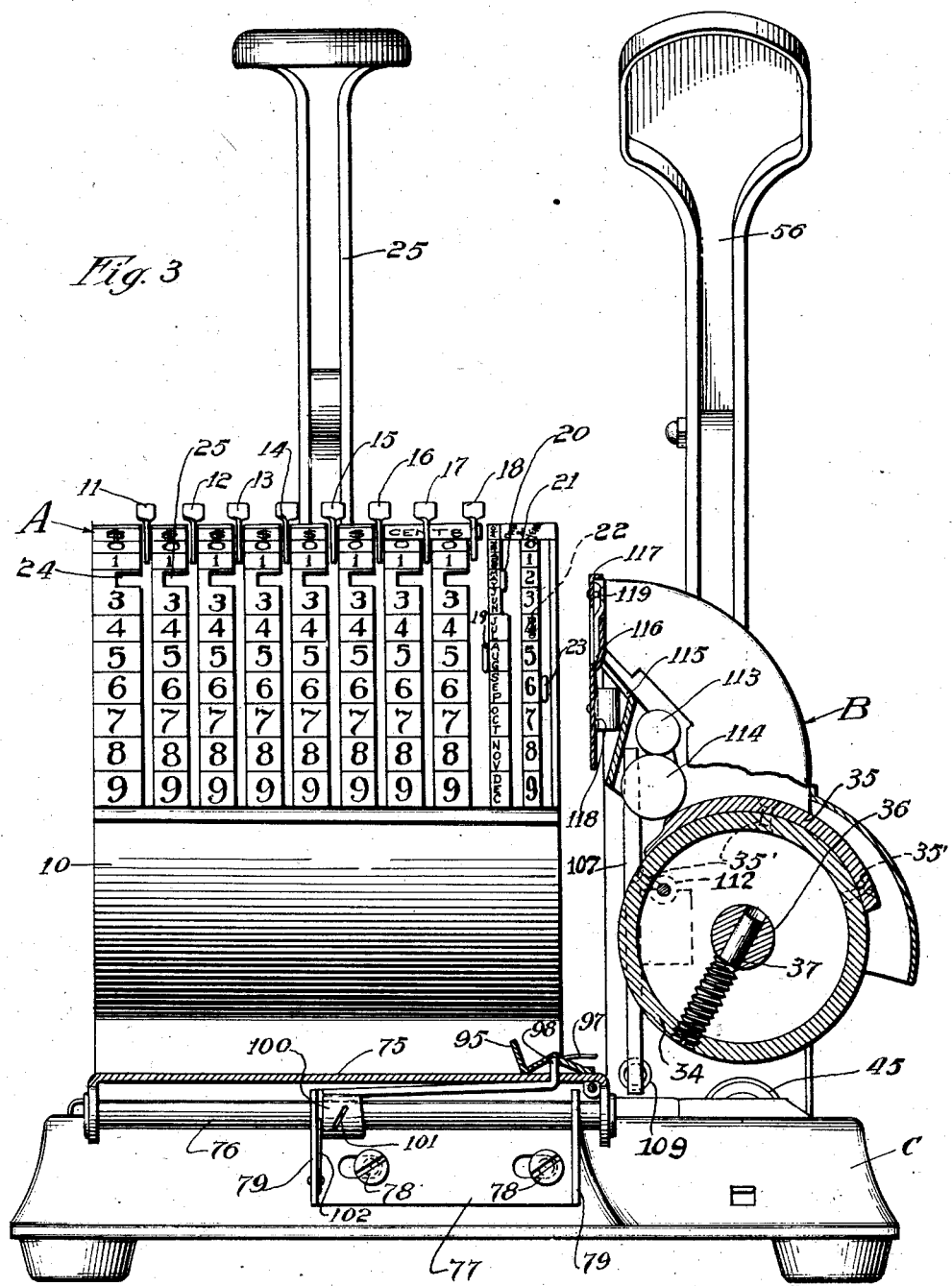
Fig. 3 is an enlarged front elevation and partial section of the machine.

For guiding the check to its proper position on the carriage table, a pair of guide fingers 98 and 99 are provided. These guide fingers project upwardly through table 75 and are also adapted to project upwardly through gripper 95 when the gripper is in check holding position. Extensions of guide fingers 98 and 99 extend under table 75 and terminate at their rear ends in a yoke 100 which is common to them both and partly surrounds rod 76. Yoke 100 is pivotally secured to rod 76 by a pin 101. As shown most clearly in Fig. 3, a flat spring 102 is secured to one flange 79 of frame 77, and bears against the edge of yoke 100 at a point below pin 101. Accordingly, when the carriage is in its normal position in front of unit A, the engagement of yoke 100 by spring 102 causes guide fingers 98 and 99 to project upwardly through the apertures in table 75 and gripper 95. However, as soon as the carriage with bar 96 starts to move toward unit B, the common yoke of the guide fingers will move away from spring 102, and the check engaging ends of the fingers will drop below the surface of table 75 under the force of gravity. The holes in frame 77 are elongated so that, by loosening screws 78, the relation between flange 100 and spring 102 may be varied.

In order to effect the removal of the check, the gripper is released upon the completion of the engagement of the check by unit B. At the extreme inner edge of gripper 95 a small finger-like projection 105 (Fig. 1) is provided. On the adjacent end of roller 34 there is a projection 106, so positioned that when the carriage has moved the check, projection 106 will engage under the finger-like projection 105 on gripper 95 and open the check holding mechanism so that gripper 95 lies open and unengaged by spring 97. This releases the check and the remaining motion which the printing roller makes will be sufficient to discharge the check completely clear of the machine.

When the check is released and while unit B is still in the act of imprinting the check with certifying or similar indicia, the carriage is returned to its check receiving position in front of unit A. The return action is automatically effected by the force stored in coil spring 93, which force is transferred to link 82 and thence through the rack and pinion mechanism to the carriage. When the return movement is complete, another check may be secured on the carriage, the gripper having been turned back when the carriage was adjacent unit B.

It is apparent that unless proper restraining mechanism were provided, a rapid depression of handle 56 might result in the roller 34 being carried past its normal position by its own inertia. This possibility is partly obviated by the arresting action which results when roller 86 strikes the depressed portion of cam 62. To insure, however, that the normal position of the printing roller will always be the same, we have provided a positive stop mechanism. A stop arm 107 is pivoted to the housing at 108 and is held normally in a counterclockwise position by a spring 109. Gear 59 has a projection such as a screw-head 111 on its face, this screw-head being so positioned that when the lever 56 is in an extreme actuated position, screw-head 111 will engage the end of stop arm 107 at 111ª and depress the same. This causes a slight counterclockwise movement of the entire arm about pivot 108, thereby causing the portion of the arm adjacent the end face of printing roller 34 to extend still nearer to this face. At the same time a dog 112 projecting outwardly from the end face of the roller engages stop arm 107, and this results in a positive arresting of the motion of the roller. The return of operating lever 56 to its normal upward position results in a movement of stop arm 107, in a reverse direction, due to spring action, thereby releasing the printing roller so that it is ready to advance as soon as the operating lever is again depressed.

In order to supply ink to the printing roller, a pair of ink rollers 113 and 114 is provided which pair of rollers is supported in a frame designated generally by the reference character 115. The frame may be supported in any suitable manner within the housing, but we show a construction which has been found good. Frame 115 is pivoted at 116 in a second slidable frame 117, and is forced against the face of the printing roller 34 by a spring 118 which is secured to frame 117. Frame 117 slides inwardly on a plate 119 secured to the housing, and is provided with a portion which extends under plate 119 and another portion which extends on top of the same, this structure resulting in a secure assembly, and at the same time permitting ready withdrawal of the entire roller assembly. Frame 117 is provided with a front flange or turned-over portion 121 which serves as a housing to close a portion of the front part of unit B. The entire roller assembly can be withdrawn by means of handle 121 for purposes of inking, replacement of rolls, and the like.

In operating the entire machine, a check is extended endwise partially under the housing portion of unit A. The edge of the check is held against guide fingers 98 and 99, and gripper 95 is then turned about its pivotal support to engage the check and hold it in the position in which it has been placed on the carriage table. The amount and date are then set by levers 11 to 23 (if not already positioned), and operating lever 25 depressed to print the amount for which the check is to be certified, and the date on which certification takes place. As soon as operating lever 25 is released, lever 56 is depressed to add to the amount line indicia of certification. The first movement of lever 56 results in a rapid traveling of the check holding carriage to unit B. At the same time the printing roller begins to revolve so that by the time the check is in position, it is engaged between matrix 35 and platen roller 45. Continued downward motion of lever 56 causes projection 106 on the printing roller to engage the finger-like projection on the check gripper and release the check in the manner described. At this time the check is already in engagement between the two rollers in unit B, and the final depressing action of the operating lever completes the rotation of the printing roller and discharges the check at the side of the machine. Operating lever 56 is released, and the mechanism returns to its normal position in the manner described.

The certification of the check is now complete, with the exception of the signature of an officer of the bank. In the illustration shown in Fig. 2, space for only a single signature is provided, but if desired, places for a number of signatures can be furnished so that if it is necessary for a bookkeeper, teller or other employee of the bank to approve the check and to signify to the signing officer that the account is good, this can all be taken care of by a single impression of the certifying machine. In other words, the machine can be modified to impress a check with indicia in accordance with whatever system is in operation in the business house in which it is used.

Having thus illustrated and described one embodiment of our invention, what we desire to secure by United States Letters Patent is as follows:

We claim:

1. In a machine of the class described designed to be employed in operating on commercial paper, means for applying indicia to the paper, means for applying additional indicia to the paper in proximity to the indicia first applied, a carriage for carrying the paper from one applying means to another, and common means for operating the second indicia applying means only, and controlling the movement of the carriage.

2. In a machine for operating on commercial paper, combination means for first applying an amount and date to the face of the commercial paper in a single operation, means for subsequently applying additional indicia about the amount and date, means for supporting the check and guiding it, and means for releasing the check as an incident to the operation of applying the additional indicia to the check.

3. A check certifier comprising a carriage having check guides thereon, a gripper on the carriage for engaging the check, means for printing an amount on the check, means for applying additional indicia to the check, a handle for operating said last mentioned means, and mechanism operated by said handle for conveying the carriage to said last mentioned means, wherein said check guides comprise projections extending upwardly from the face of the carriage, which are adapted to drop to a lower position as an incident to the movement of said carriage.

4. A check certifier comprising a carriage having check guides thereon, a gripper on the carriage for engaging the check, means for printing an amount on the check, means for applying additional indicia to the check, a handle for operating said last mentioned means, and mechanism operated by said handle for conveying the carriage to said last mentioned means, wherein the mechanism for conveying said carriage comprises guideways on the carriage, a rack moved by the operating handle, a pivoted arm having a gear segment engaging the rack and a finger projecting into the guideways on the carriage.

5. A check certifier comprising a carriage designed to positively hold a check in a predetermined position, means for preliminarily printing an amount on the check, a printing roller for applying indicia of certification to the check, a platen roller co-operating with said printing roller, and common mechanism for operating said printing roller and transferring the carriage to a position so that the check held by the carriage will be engaged by the printing roller as an incident to the operation of such roller.

6. A check certifier as defined in claim 5 wherein the check is automatically released from engagement by the carriage as an incident to the operation of applying indicia of certification.

7. A check certifier comprising a carriage designed to positively hold a check in a predetermined position, means for printing an amount on said check, a printing roller adapted to print additional indicia on the check, common means for operating the printing roller and advancing the check carriage to a position adjacent the printing roller, and means carried by the printing roller and co-operating with the carriage for automatically releasing the check as an incident to the operation of said printing roller.

8. A check certifier comprising a carriage designed to positively hold a check in a predetermined position, means for printing an amount on said check, a printing roller adapted to print additional indicia on the check, common means for operating the printing roller and advancing the check carriage to a position adjacent the printing roller, and means for positively engaging the roller to prevent its own inertia carrying it beyond a complete revolution, the normal position of the roller being thereby positively fixed.

9. A check certifier as defined in claim 8 wherein a platen roller is provided, said roller co-operating with the printing roller to engage the check and being releasably secured in the frame portion of the machine so that it can be readily extracted for purposes of repair or replacement.

10. In a machine of the class described, a first unit for printing the amount and date on a check having an operating handle, a second unit for printing additional indicia about that part of the check bearing the amount, a carriage for supporting the check, an operating handle for the second printing unit and mechanism actuated by the operating handle for conveying the carriage from first unit to second.

11. In a machine of the class described, a unit for printing the amount and date on a check, a unit for printing additional indicia thereon, a carriage for supporting the check, a gripper securing the check in place on the carriage, an operating handle for actuating one printing unit and conveying the check, automatically, from one unit to the other, and means carried by one unit for engaging the check gripper and releasing the check.

12. In a machine of the class described, a unit for printing an amount, a unit for printing additional indicia, said unit including a matrix bearing roller and platen roller, a carriage, a gripper for the check, securing it to the carriage face, an operating handle for the additional indicia printing unit, mechanism operated by said handle for conveying the handle from one unit to the other, and a projection on one of the rollers for engaging the gripper to turn it back and release the check.

13. In a certifying machine comprising two printing units, one having a printing roller as an essential part thereof, a carriage for conveying a check from one unit to the other, said carriage comprising a carriage table, a gripper hinged to the table and adapted to engage the check and hold it on the carriage table, and a projection on the printing roller designed to turn the gripper about its hinge and release the check.

14. In a certifying machine comprising two printing units, one having a printing roller as an essential part thereof, a carriage for conveying a check from one unit to the other, and guide fingers on said carriage for positioning a check thereon, the guide fingers extending above the top of the carriage and designed to drop to a position below the carriage as the carriage is moved as an incident to its transfer from one printing unit to the other.

15. In a certifying machine comprising two printing units, one having a printing roller as a part thereof, a carriage for conveying a check from one unit to the other, said carriage comprising a carriage table having apertures therein, a gripper hinged to the table and having apertures coinciding with the apertures in the table when in the position of gripping a check, and guide fingers extending through the apertures, said guide fingers designed to drop to a position below the carriage table and gripper as an incident to the movement of said carriage from one unit to the other.

16. In a certifying machine comprising two printing units, one having a printing roller as a part thereof, a carriage for conveying a check from one unit to the other, said carriage comprising a carriage table having apertures therein, a gripper hinged to the table and having apertures coinciding with the apertures in the table when in the position of gripping a check, guide fingers extending through the apertures, said guide fingers designed to drop to a position below the carriage table and gripper as an incident to the movement of said carriage from one unit to the other, and a projection on the roller designed to engage the gripper and release the check, the check being discharged from the machine as an incident to the operation of the printing roller.

In witness whereof, we hereunto subscribe our names this 16 day of April, 1927.

JOHN W. CARLSON.
THOMAS M. WALSH.
OLE SLETTEVOLD.